United States Patent [19]

Freiheit

[11] 3,748,947
[45] July 31, 1973

[54] MELODY CHORD CONSTRUCTOR FOR STRING INSTRUMENTS

[76] Inventor: Roger E. Freiheit, Rt. 1, Box 96, Lakebay, Wash. 98349

[22] Filed: Jan. 10, 1972

[21] Appl. No.: 216,550

[52] U.S. Cl.......................... 84/485, 84/471, 84/477
[51] Int. Cl. ............................................. G10b 15/00
[58] Field of Search ... 84/470–473, 477 R, 482, 485

[56] References Cited
UNITED STATES PATENTS

| | | | |
|---|---|---|---|
| 1,556,147 | 10/1925 | Johnson et al. | 84/485 |
| 2,001,191 | 5/1935 | Golden | 84/485 |
| 3,668,967 | 6/1972 | Malis | 84/471 |
| 2,814,231 | 11/1957 | Jones | 84/485 |
| 3,245,303 | 4/1966 | Patt | 84/485 |

FOREIGN PATENTS OR APPLICATIONS

| | | | |
|---|---|---|---|
| 566,262 | 12/1932 | Germany | 84/473 |
| 1,512,399 | 12/1966 | France | 84/471 |

Primary Examiner—Richard B. Wilkinson
Assistant Examiner—Lawrence R. Franklin
Attorney—Christensen & Sanborn

[57] ABSTRACT

After a brief discussion of the construction and operation of a typical stringed instrument, such as a guitar, a melody chord constructor therefor is shown which includes a base unit having located thereon symbols denoting the instrument's musical notes which are arranged in rows and columns corresponding to the fingerboard's strings and frets. A transparent member is relatively slidable on the base unit and has located thereon a plurality of numerical symbols arranged in rows and columns corresponding to those of the base unit. In one position, the symbols "1" on the slide member register with note symbols on the base unit corresponding to the root notes of an arbitrarily chosen scale, such as G. The remainder of the numerical symbols correspond to the major scale degrees useful in melody chord construction, that is, the 3, 5, 6, 7, b7, 9 and 11 degrees, and register with the corresponding notes of the G major scale on the base unit. By translating the slide member relative to the base unit, the notes corresponding to the root and degrees of any other major scale can be readily ascertained. Additional slide members having the various minor scale degrees thereon can be interchanged with the major scale slide member.

5 Claims, 4 Drawing Figures

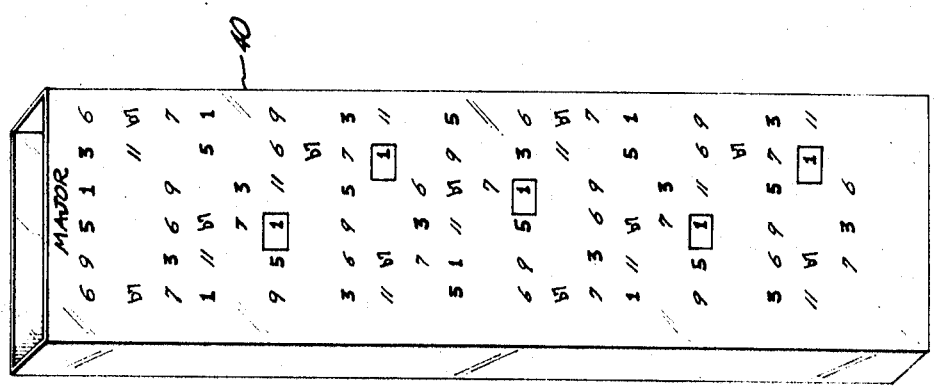
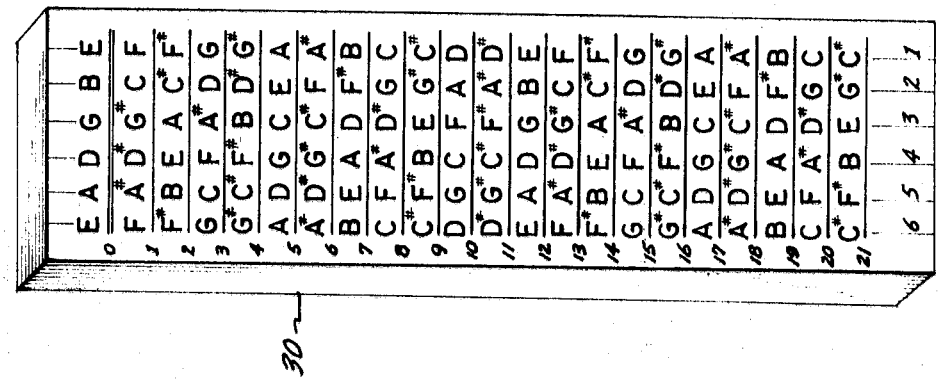
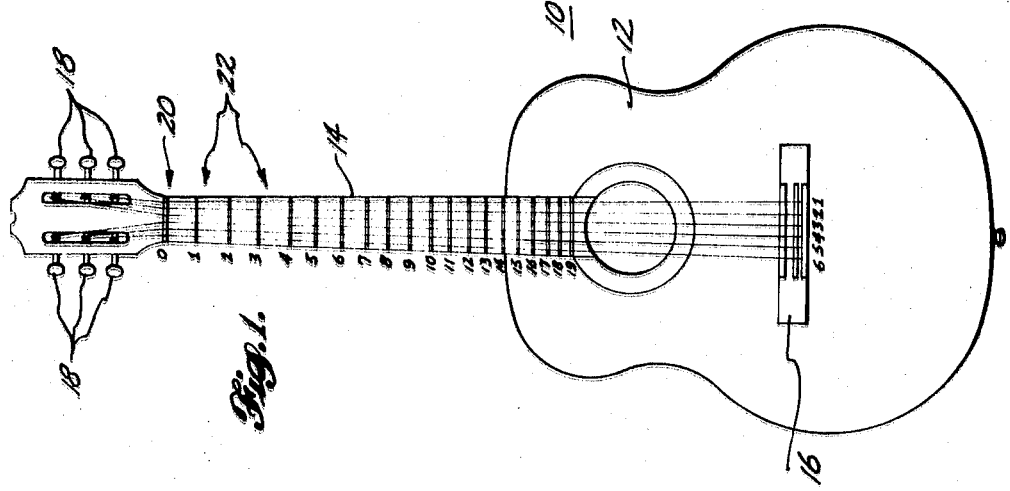

MELODY CHORD CONSTRUCTOR FOR STRING INSTRUMENTS

FIELD OF THE INVENTION

This invention generally relates to an apparatus for increasing the capability of a musician to play melody chords on a stringed instrument, and, more particularly, to a melody chord construction device therefor.

BACKGROUND OF THE INVENTION

There have been many ways previously available for enabling a musician to learn the fingering of rhythm chords useful in playing a stringed instrument, such as a guitar or the like. One way is the use of a trained teacher who is able to instruct as to the various fingerings and as to variations therefrom. The amount of time needed by both the teacher and by the pupil in such a course of instruction is considerable.

Manuals have also been devised which either illustrate the fingering for a few basic rhythm chords, with accompanying instructions as to how to develop additional chords therefrom, or which alternatively attempt to illustrate a large number of rhythm chords. In the former case, chords beyond those illustrated cannot be learned except by the application of much energy. Often times, a trained teacher is required in addition to such a manual. In the latter case, the manual is often so bulky and cumbersome so as to be unusable.

A third type, that of automatic chord finders, has been proposed. Generally, these chord finders include a replica of the instrument's fingerboard and further include means relatively movable therewith for indicating the preferred finger positions for a select number of rhythm chords. Although these chord finders have found certain uses, their operation also involves serious disadvantages. For example, the chords are limited in number because of the construction thereof. In addition, these chord finders do not give the musician sufficient information to construct chords in addition to those "found" by the device, inasmuch as the information provided thereby is not related to either known chord symbols or to scale degrees thereof.

In all cases, there has been no easy way for the trained musician to construct melody chords. "Melody" chords may be distinguished from "rhythm" chords in that the latter are relatively standard in musical content and are used when the stringed instrument is played to establish a rhythm line for a melody either sung or played by another instrument, whereas the former are varied in musical content and are generally formed using the melody note as the highest pitched note thereof. The prior chord finders cannot provide information as to melody chords precisely because no information is available therefrom as to the relation of the notes in the chord selected to a desired melody note or notes.

It is therefore an object of this invention to provide a melody chord construction device for a stringed instrument which can be used to construct melody chords, in any major or minor scale, in a virtually unlimited number.

It is a further object of this invention to provide such a melody chord construction device which illustrates to the user thereof the desired fingering and chord degrees, including the root degree, for all chords which can be constructed from a given major or minor scale.

SUMMARY OF THE INVENTION

These objects and others are achieved in one embodiment of the invention by the provision of a base unit which has located thereon a plurality of symbols arranged in rows and columns corresponding to the strings and frets of an instrument's fingerboard, the symbols denoting the notes sounded by the instrument when a string depression is made at a corresponding location on the fingerboard, and by a transparent member which is relatively slidable with said base unit, said transparent member having located thereon a second plurality of symbols arranged in rows and columns corresponding to the strings and frets of the instrument's fingerboard, said second plurality of symbols representing the scale degrees of a major or other scale which, when the slide member and base unit are in a predetermined positional relationship, overlay the corresponding note symbols of an arbitrarily chosen scale.

BRIEF DESCRIPTION OF THE DRAWINGS

The invention can perhaps best be understood by reference to the following portion of the specification, taken in conjunction with the accompanying drawings, in which:

FIG. 1 is a front elevation showing a typical guitar;

FIG. 2 is a pictorial view showing one embodiment of the base unit and slide member of this invention in disassembly;

DESCRIPTION OF A PREFERRED EMBODIMENT

Figure 4:
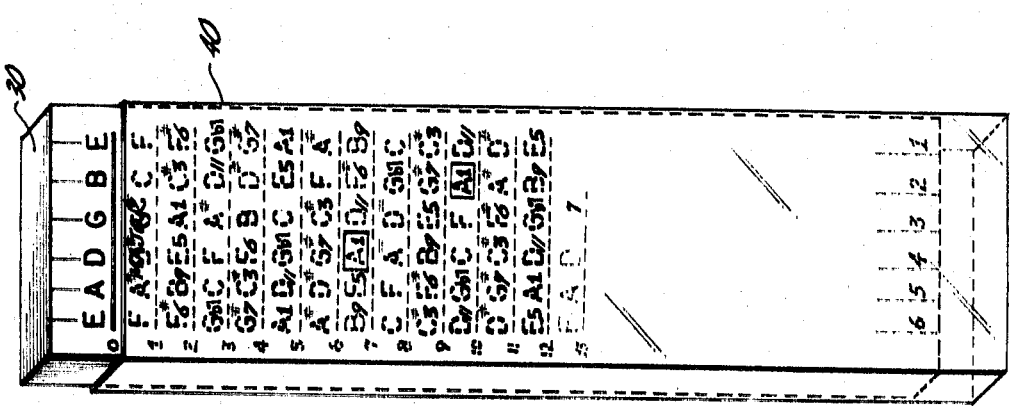
FIG. 4 is a pictorial view showing the slide member in a shifted position.

With reference now to FIG. 1, a typical stringed instrument, such as a guitar 10, includes a body portion 12 and a neck portion 14 extending therefrom. A plurality of strings, numbered 1, 2, 3, 4, 5 and 6, are stretched between a bridge 16 on the body portion 12 and a corresponding plurality of tuning keys 18 in the upper end of the instrument neck 14. The effective "open-string" sounding length of each string is determined by a fret nut 20 on the neck 14 and a corresponding raised portion of bridge 16.

The guitar 10 is tuned by adjusting the tension of each of the strings by appropriate rotation of the corresponding tuning key 18. Each string is adjusted to a predetermined pitch, the pitches of the strings having a predetermined relationship.

To change the pitch of each string in order to sound notes other than the "open-string" notes, a plurality of frets 22 are spaced along the neck 14. Together with the fret nut 20, which is given the number 0, these frets are numbered 1, 2, etc., in the order of their advance down the neck portion towards the body portion 12.

The pitch of each string can be changed by depressing the string immediately above the desired fret with the finger, as a result of which the effective length of the string is changed to equal that supported between the corresponding fret and the raised portion of bridge 16. Therefore, the portion of neck 14 between the fret nut 20 and the body portion 12 is also known as the fingerboard.

In a well known manner, melodies including notes other than the "open-string" notes of the instrument can be played by appropriate finger depressions of individual strings behind desired frets. In a like manner, musical chords can be constructed by depressing two or more of the strings while simultaneously plucking or otherwise causing the strings to vibrate.

In order to fully understand the present invention, a brief review of basic music theory is required. The musical scales are subdivided into a first group, based on the root or dominant note thereof. For example, the C scale has as its root the note of C. In addition, the scales are arranged in a second group wherein each type within the group denotes a predetermined relationship between the notes of the scale. For example, there is one major scale and a plurality of minor scales. The term "interval" denotes the difference in pitch between two successive notes or "degrees" of any scale. If the smallest difference in pitch or interval is arbitrarily represented by a step of one-half, all major scales have the following intervals: 1-1-½-1-1-1-½. The C major scale includes the notes C, D, E, F, G, A, B, C, with the intervals between these notes proceeding as previously discussed and with the C or root note of the scale being given a degree of 1, the successive note D being given a degree of 2, and so forth. On the other hand, the typical minor scale has the following intervals: 1-½-1-1-1-1-½. The C minor scale includes the notes C, D, $E_b$, F, G, A, B, C, with the root note C again being given a degree of 1, the successive note D again being given a degree of 2, and the third note $E_b$ being given a degree of $b3$.

The degree notation is a shorthand way of indicating, for any scale, (a) the position of the root or dominant note, (b) the relationship of the remaining scale notes to the root note, and (c) the intervals between any two successive notes.

A melody chord comprises those notes which harmonize with the melody note. Generally, melody chords use as a foundation the above-mentioned degrees, in a scale determined by the appropriate rhythm chord for a passage of melody.

The appropriate rhythm chord may be chosen by the experienced musician, or may be found on available sheet music. A replica of a portion of the fingerboard, including the strings and frets, which has illustrated thereon the desired relative finger positioning for a rhythm chord appropriate for a passage of a melody, is usually found in sheet music at the beginning of the passage.

This rhythm chord may also serve as a melody chord for one or more notes of the passage if the requirement for a melody chord is met. Simply, a melody chord must include the melody note as the highest-pitched note thereof. Therefore, the illustrated rhythm chord cannot be used in conjunction with all melody notes of the passage. When the musician is merely accompanying a melody which is sung or produced by another, the illustrated rhythm chord suffices. However, when he wishes to play the melody directly, appropriate melody chords must be used.

Because the typical rhythm chord diagram illustrates only the desired finger placement for a given rhythm chord, it cannot be used to ascertain the finger placement that is needed to construct all melody chords needed which use as a foundation the degrees of the scale illustrated by the rhythm chord. As previously discussed, chord manuals and chord finders cannot be readily used to ascertain melody chords, as they are primarily compilations of rhythm chords and do not provide any information relative to the location on the fingerboard as to the degrees of the scale of a rhythm chord appropriate for a melody passage.

Turning now to FIG. 2, the melody chord construction device of this invention includes a base unit 30 which comprises a rectangular block having located on at least one surface thereof a replica of the fingerboard of neck portion 14. This replica includes a plurality of spaced, vertical lines corresponding to the strings 1-6, and a plurality of spaced, horizontal lines corresponding to the fret nut 20 and the frets 22, in positions 0, 1, 2, etc. Also located on the face of base unit 30 are a plurality of symbols. The symbols immediately above the 0 position, or above that of the fret nut 20, correspond to the "open-string" notes that are sounded when the instrument is played. The symbols in the first to 21st positions correspond to the notes that are sounded when the corresponding string is depressed in that position.

Figure 3:
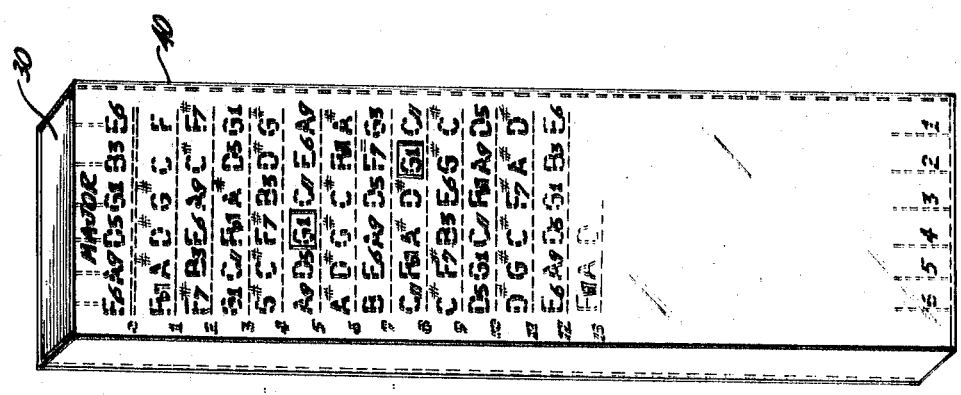
FIG. 3 is a pictorial view showing the slide member and base unit of FIG. 2 in assembly, with the slide member being in its predetermined position.

The invention also includes a member 40 which may comprise a hollow rectangular block entirely composed of a transparent material. In assembly, as best seen in FIG. 3, the transparent member slips over base unit 30.

Located on the front surface of transparent member 40 are a plurality of numerical symbols arranged in rows and columns corresponding to the strings and frets of the fingerboard. The choice and arrangement of these numerical symbols is arrived at in the following manner. Melody chords are all built on a foundation chord comprising either a major or a minor triad. The major triad comprises a chord having notes of the degrees 1, 3, and 5, and the minor triad comprises notes having the degrees 1, $b3$, and 5. The degrees of the major triad appear as regular numerals on the face of member 40. To form other chords, additional notes in the scale must be added to the foundation chord. These additional chords may be generally classified as follows. First, the tonic major, which comprises a major triad, or a major triad with notes having one or more of the following scale degrees added thereto: 6, 7, 9, 11, 13. Second, the tonic minor, which comprises a minor triad, or a minor triad with notes having one or more of the following scale degrees added thereto: 6, 7, 9, 11, 13. Third, the minor seventh, which comprises a minor triad with an added note having a $b7$th scale degree. Fourth, the dominant seventh, which comprises a major triad with an added note having a $b7$th scale degree. Fifth, the minor seventh, extended, which comprises a minor triad with notes having the $b7$th degree and any of the following scale degrees: 9, 11, 13. Sixth, a dominant seventh, extended, which comprises a major triad with notes having the $b7$th degree and any of the following scale degrees: 9, 11, 13. Finally, the altered chord, which comprises any of the first six, with notes having scale degrees 5, 9, 11, either sharped or flatted.

Therefore, the scale degrees 6, 7, $b7$, 9, 11, and 13, are essential in construction of all melody chords. The surface of transparent member 40 includes italicized numerals corresponding to these scale degrees, with the exception of the degrees $b7$ and 13. The degree $b7$ is indicated in reverse italic numerals, because of its convenience in constructing minor seventh and dominant seventh, minor seventh extended and dominant seventh extended chords. The degree 13 is not illustrated because it duplicates the same note as the degree 6, but an octave higher. If desired, the groups of scale degrees could also be indicated by a different color symbol for each group.

The relative placement of the numerical symbols on member 40 is governed in part by the note symbols, in rows and columns, of base unit 30, and in part by an arbitrarily chosen scale.

With particular reference now to FIG. 3, the member 40 and base unit 30 are shown in assembly. It should be noted that the degree "1" numerals overlie and register with the symbols for the note G in every appearance thereof on the base unit 30. In construction of the member 40, the G major scale was arbitrarily chosen as the reference scale. Therefore, the numerical symbols 1, 3, 5, 6, 7, b7, 9, and 11 were placed in registry with the notes on the base unit 30 having the corresponding scale degrees in the G major scale.

In the position illustrated in FIG. 3, the musician can construct practically any melody chord which will harmonize with any melody note, where the appropriate rhythm chord is in the scale of G major, in any octave, by trying various combinations of the notes represented by the overlying degree numerals. The chord constructor not only illustrates to the user what notes can be used inconstructing chords which will harmonize a "G major" melody note, but also indicates directly the relative finger placement on the fingerboard needed to reproduce those chords. In addition, since the scale degrees are segregated into at least three types, that is, the degrees corresponding to the triads, the degrees corresponding to superimpositions to those triads, and the b7th degree, the user can quickly ascertain chords for use in both standard harmony, comprising the chord types discussed in more detail above, and in jazz harmony, which comprises chords constructed essentially from the superimposition degrees, that is, 6, 7, 9 and 11.

The chords to harmonize any melody note whose appropriate rhythm chord, or foundation, lies in another scale can be ascertained in the following manner. With particular reference now to FIG. 4, the relative position of the base unit 30 and member 40 have been shifted so that the scale degree numeral 1 overlies and registers with the symbol A on the base unit 30. All of the degree numerals "1" overlie the "A" symbols, and the remaining degree numerals 3, 5, etc., each overlie and register with corresponding but identical letter symbols. Therefore, by relatively moving the member 40 and base unit 30, chord transposition is effected. The chord constructor can provide this operation because all major scales have the same interval relationships, and because changes in pitch in a direction of movement along the strings of the finger-board proceed in uniform, half-step intervals.

The front surface of member 40 may also have located thereon numerical symbols corresponding to the degrees of any minor scale. The typical minor scale would only require the addition of a b3 degree. Or, the replica of the fingerboard on the front of base unit 30 can be duplicated on the back thereof, and the rear surface of member 40 can have located thereon the minor scale degrees.

The use of the melody chord constructor of this invention will be evident to any musician, once it is realized that by relative positioning of member 40 and base unit 30 so that the degree numerals "1" overlie and register with the root of the scale of the appropriate rhythm chord, or foundation, all notes that will harmonize this melody note in all octaves, and the degrees thereof, are immediately indicated.

Therefore, it is to be understood by those skilled in the art that the invention is not to be limited to the specific embodiment described, but rather is intended to be bounded only by the limits of the appended claims.

I claim:

1. A melody chord constructor for use with a stringed instrument having a plurality of strings and frets arranged along a fingerboard, said constructor comprising a base unit having means located thereon which comprise a plurality of note symbols, said note symbols being arranged in rows and columns corresponding to the strings and frets of the instrument's fingerboard, said note symbols denoting the notes capable of being sounded by the instrument when a string depression is made at a corresponding location on the fingerboard, and a member relatively slidable with respect to said base unit, said member including means located thereon which comprise a plurality of numerical symbols arranged in rows and columns corresponding to the strings and frets of the instrument's fingerboard, said plurality of numerical symbols representing the degrees of a musical scale, said plurality of numerical symbols being arranged so that when said member and said base unit are in a predetermined positional relationship, said plurality of numerical symbols are in registry with corresponding ones of said plurality of note symbols on said base unit for an arbitrarily chosen musical scale.

2. A melody chord constructor as recited in claim 1, wherein said member is composed of a transparent material and said plurality of numerical symbols are located thereon so as to overlie corresponding ones of said plurality of note symbols.

3. A melody chord constructor as recited in claim 1, wherein said plurality of numerical symbols represent the degrees of a major scale.

4. A melody chord constructor as recited in claim 1, wherein said plurality of numerical symbols represent the degrees of a minor scale.

5. A melody chord constructor as recited in claim 1, wherein said plurality of numerical symbols are separated into groups of distinct indications, one for the triad degrees, one for the superimposition degrees, and one for the b7th degree.

* * * * *